United States Patent Office 2,893,356
Patented July 7, 1959

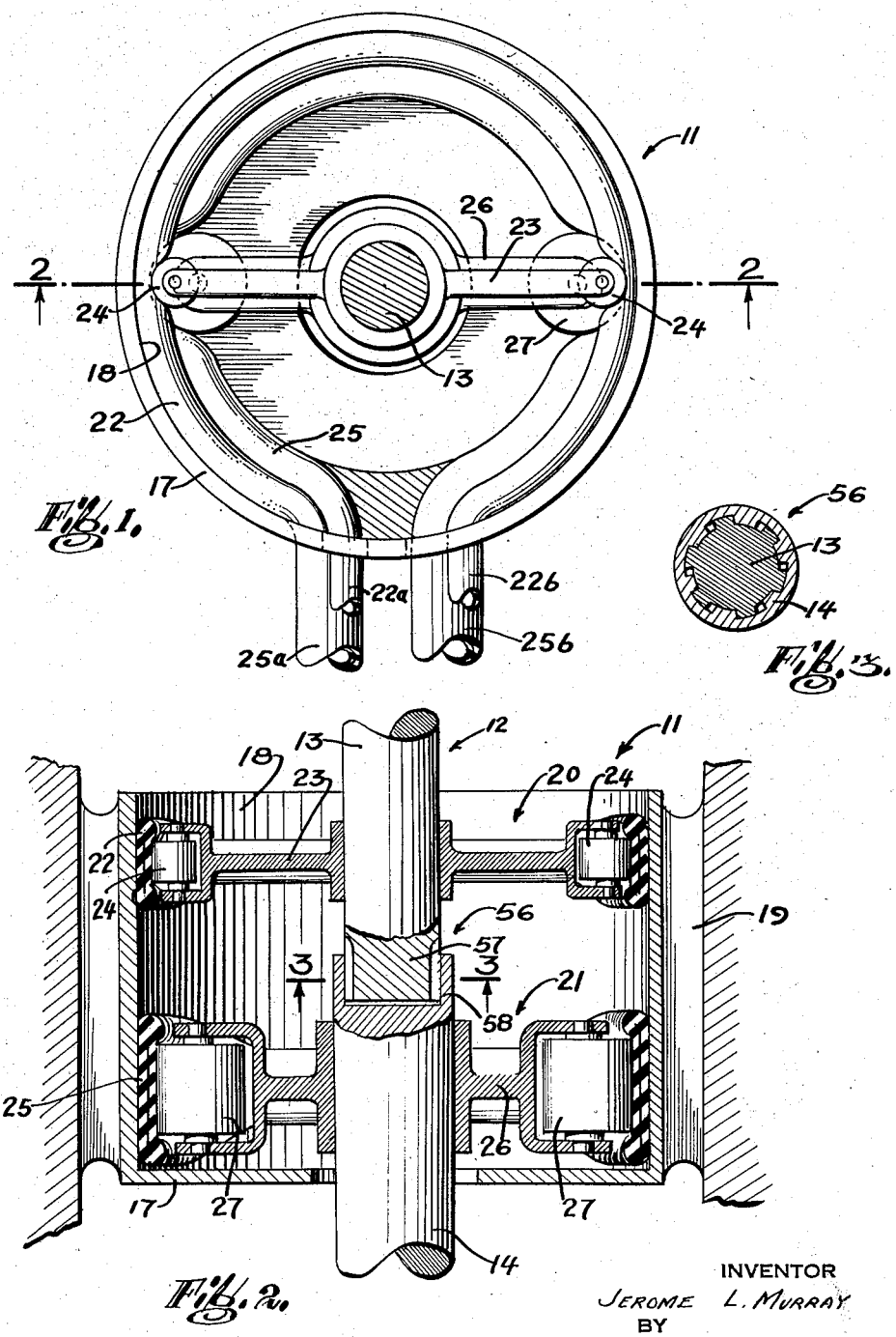

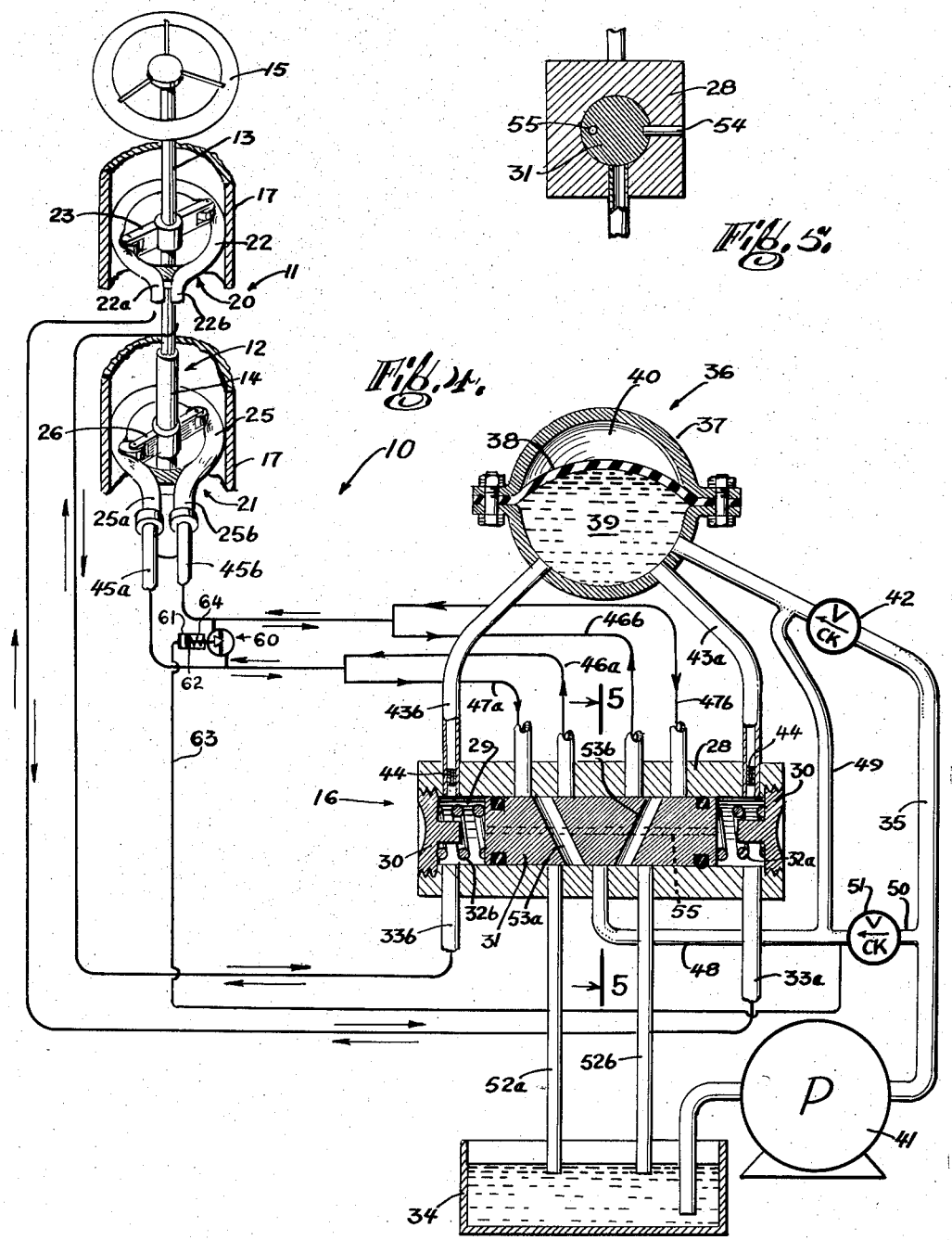

2,893,356

SERVO DRIVE POWER STEERING MECHANISM AND THE LIKE

Jerome L. Murray, New York, N.Y.

Application February 1, 1956, Serial No. 562,809

10 Claims. (Cl. 121—41)

The present invention relates generally to servo drive mechanisms, and is particularly directed to a servo drive power steering mechanism for automobiles and the like.

Power steering mechanisms of various types are now widely employed on automobiles and the like to reduce the forces that must be applied by the driver to the steering wheel for the purpose of turning the steerable wheels of the automobile. The existing power steering mechanisms have been criticized on the grounds that, to at least some extent, they adversely affect the precision of steering control and the driver's "feel" of the road.

Accordingly, it is an object of the present invention to provide a servo drive arrangement particularly useful as an improved power steering mechanism for automobiles having precise steering characteristics and responsiveness as well as the capability of communicating the "feel" of the road to the driver.

Heretofore, for example, as in my co-pending application for United States Letters Patent Serial No. 525,296, filed July 29, 1955, proposals have been made for fluid pressure devices of the type having a length of resilient tube disposed against a backing surface and presser means movable along the resilient tube to locally flatten or reduce the cross-sectional area of the latter so that the device can be used either as a fluid pump, when the presser means is mechanically driven along the tube and pumps fluid supplied to the latter, or as a fluid pressure operated motor, when fluid is pumped through the resilient tube and thereby drives the presser means along the latter. It is apparent that the backing surface of such a fluid pressure device may be arcuate and the presser means may comprise a roller or rollers carried by a rotor that is mounted for rotation about an axis concentric with the arcuate backing surface so that the rollers follow a circular path parallel to the arcuate surface while progressively flattening the resilient tube against such surface. When the parts of the fluid pressure device are arranged in the manner described above, rotation of the roller carrying rotor causes the device to act as a reversible pump for propelling fluid through the resilient tube in one direction or the other, depending upon the direction of rotation of the rotor, while the supplying fluid under pressure to one end or the other of the resilient tube causes the device to act as a motor for rotating the rotor in one direction or the other, depending upon the end of the resilient tube to which the fluid under pressure has been supplied.

In accordance with the present invention, a servo drive power steering mechanism for automobiles and the like is associated with a steering shaft that is fashioned in two parts having a loose safety coupling therebetween permitting limited relative angular movement of the two parts of the shaft, one shaft part being connected to the steering wheel for rotation by the latter while the other shaft part is connected to the usual steering mechanism for operating the latter, and the servo drive power steering mechanism is characterized by a first fluid pressure device of the described character having its rotor connected to the shaft part extending from the steering wheel to act as a reversible pump actuating a valve assembly that directs fluid under pressure to one end or the other of the resilient tube of a second fluid pressure device of the described character acting as a reversible motor and having its rotor connected to the other shaft part operating the steering mechanism so that the force available for operating the latter is determined by the pressure of the fluid supplied to the second fluid pressure device and the driver is required to exert only the relatively small force necessary for turning the rotor of the first fluid pressure device to actuate the control valve assembly.

The above, and other objects, features and advantages of the present invention, will be apparent in the following detailed description of an illustrative embodiment which is to be read in connection with the accompanying drawings forming a part hereof, and wherein:

Fig. 1 is a plan view of an assembly included in a servo drive power steering mechanism embodying the present invention;

Fig. 2 is a transverse sectional view taken along the line 2—2 of Fig. 1;

Fig. 3 is a detail sectional view taken along the line 3—3 of Fig. 2;

Fig. 4 is a schematic view, partly in perspective and partly in section, of a complete servo drive power steering mechanism embodying the present invention; and Fig. 5 is a detail sectional view taken along the line 5—5 of Fig. 4 and showing certain constructional features of a control valve assembly included in the illustrative embodiment of the invention.

Referring to the drawings in detail, and initially to Fig. 4 thereof, it will be seen that a servo drive power steering mechanism embodying the present invention and there generally identified by the reference numeral 10 includes, as its major components, an actuating and power assembly 11 associated with the steering shaft 12 of an automobile which is formed in two axially aligned parts 13 and 14 respectively connected to the steering wheel 15 and to the usual steering mechanism (not shown) and a control valve assembly 16 which controls the supplying of fluid under pressure to the portion of the assembly 11 associated with shaft part 14 and is actuated by the portion of the assembly 11 associated with shaft part 13 in response to turning of the latter by steering wheel 15.

The actuating and power assembly 11, the details of which appear in Figs. 1 and 2, has a cylindrical, rigid casing 17, defining an arcuate backing surface 18 concentric with the axis of the steering shaft 12, and held against rotation in a suitable supporting structure 19. The parts of the assembly 11 within its casing 17 are divided into an actuating unit, generally identified by the reference numeral 20, and a power or drive unit, generally identified by the reference numeral 21.

The actuating unit 20 includes a length of resilient tube 22 formed, for example, of rubber or the like, and preferably having a fabric layer embedded in the wall for increased strength and resistance to fatigue failure. The tube 22 is arranged against the arcuate backing surface 18 of the casing 17, and the opposite end portions 22a and 22b extend through suitable adjacently disposed openings in the side wall of the casing. A rotor 23 is secured on the shaft part 13 for rotation with the later in a radial plane extending through the resilient tube 22, and presser rollers 24 are rotatably mounted on the rotor 23 with their axes of rotation arranged parallel to the axis of rotation of shaft part 13. The rollers 24 are radially disposed on the rotor 23 so that the radial clearance between such rollers and the arcuate backing surface 18 is substantially less than the normal outer diameter of the circular cross-section of the resilient tube so that, at the locations where the rollers 24 engage the tube 22, the latter is flattened against the backing surface 18.

It is apparent that, if the shaft part 13 is rotated in the clockwise direction, as viewed in Fig. 1, by corresponding turning of the steering wheel 15, while the end 22a of the resilient tube 22 is connected to a supply of fluid, the rollers 24 will advance along the tube 22 and progressively flatten the latter in the clockwise direction to pump fluid from the end 22a out of the end 22b of the tube. On the other hand, if the shaft part 13 is rotated in the counter-clockwise direction, as viewed in Fig. 1, and the tube end 22b is connected to the supply of fluid, the rollers 24 will progressively flatten the tube 22 in the counterclockwise direction to pump fluid out of the end 22a of the resilient tube.

The power or drive unit 21 of the actuating and power assembly 11 includes a length of resilient tube 25 which is similar to the tube 22, but preferably has a larger normal internal cross-sectional area. The tube 25 is disposed against the arcuate backing surface 18 of rigid casing 17 below the tube 22, and the opposite end portions 25a and 25b also extend from the casing through suitable, adjacently disposed openings in the cylindrical wall of the latter. A rotor 26 is secured on the shaft part 14 for rotation with the latter in a radial plane extending through the tube 25, and presser rollers 27 are rotatably mounted on the rotor 26 with the axes of rotation of such rollers being parallel to the axis of rotation of the shaft part 14. The rollers 27 are radially disposed on the related rotor so that the radial clearance between the rollers 27 and the arcuate backing surface 18 is substantially less than the normal outer diameter of the circular cross-section of tube 25, whereby the latter is substantially completely flattened against the backing surface at the locations where the tube 25 is engaged by the rollers 27.

It is apparent that, if fluid under pressure is admitted to the end 25a of the tube 25, the pressure of the fluid acting against the flattened or restricted area of the tube will tend to advance or move the roller 27, causing the flattening or restriction, along the tube in the direction toward the end 25b of the latter, thereby effecting clockwise rotatoin of the rotor 26 and shaft part 14, as viewed in Fig. 1. Conversely, if the fluid under pressure is admitted to the end 25b of the tube 25, the rotor 26 and shaft part 14 are rotated in the counter-clockwise direction, as viewed in Fig. 1. It is apparent that the force with which the shaft part 14 is rotated is determined by the degree of flattening of the tube 25 by the rollers 27 and the pressure of the fluid admitted to one end or the other of the tube 25.

In accordance with the present invention, the actuating unit 20, acting as a reversible fluid pump in response to turning of the steering wheel 15 and its related shaft part 13, actuates the control valve assembly 16 which, in turn, controls the supplying of fluid under pressure to one end or the other of the tube 25 of power unit 21 so that the latter acts as a reversible fluid pressure operated motor to turn the shaft part 14 connected to the usual steering mechanism.

As seen in Fig. 4, the control valve assembly 16 includes an elongated valve housing 28 having a longitudinal bore 29 extending therethrough and closed at its opposite threaded ends by suitable plugs 30. A valve body 31 of a length shorter than that of the bore 29 is longitudinally slidable within the bore 29 and is normally held in a centered position between the plugs 30 by equalizing springs 32a and 32B which are interposed between the opposite ends of the valve body and the adjacent plugs. Conduits 33a and 33b extend from the ends 22a and 22b, respectively, of the resilient tube 22 and open into the bore 29 of the valve housing 28 adjacent the opposite ends of the latter so that, when the steering wheel 15 is rotated in the clockwise direction to pump fluid through the tube 22 from the end 22a out of the end 22b, the pressure of such fluid transmitted by the conduit 33b and acting against the left-hand end of the valve body 31, as viewed in Fig. 4, causes longitudinal movement of the body 31 toward the right from its normal centered position. Conversely, when the steering wheel 15 is turned in the counter-clockwise direction, the corresponding pumping action of the actuating unit 20 causes shifting of the valve body 31 toward the left, as viewed in Fig. 4, from its normal, centered position.

The fluid to be pumped by the actuating unit 20 for displacing the valve body 31 in the manner described above is obtained from a tank or reservoir 34. A feed conduit 35 extends from the tank 34 to a pressure accumulator 36 which, as is usual, has a spherical casing 37 provided with a flexible diaphragm 38 extending thereacross to divide the interior of the casing into a main chamber 39 and an accumulating chamber 40 containing a compressible fluid, for example, air. The conduit 35 opens into the main chamber 39 and has a pump 41 interposed therein to pump fluid under pressure from the tank 34 into the chamber 39 of the pressure accumulator. During operation of the pump 41, the air in chamber 40 of the pressure accumulator is compressed to an extent determined by the maximum pressure built-up by the pump and, in the event that the pressure head of the pump diminishes, for example, by reason of a decrease in the speed with which the latter is driven, the compressed air in chamber 40 is available to maintain the pressure on the fluid in chamber 39. Of course, a check valve 42 is provided in the conduit 35 between the pump 41 and the pressure accumulator to prevent reverse flow through the conduit 35 when the pressure in chamber 40 exceeds the pressure head developed by the pump.

Conduits 43a and 43b extend from the chamber 39 of the pressure accumulator to the opposite ends of the valve housing 28 for supplying fluid to the conduits 33a and 33b and hence to the tube 22 of the actuating unit. Preferably, the conduits 43a and 43b have restrictions or bleed orifices 44 disposed therein so that the differential pressure developed by rotation of the rotor 23 of the actuating unit 20 for effecting displacement of the valve body 31 will not be immediately dissipated by the communication between the opposite ends of the valve housing 28 through the conduits 43a and 43b and the chamber 39 of the pressure accumulator.

As seen in Fig. 4, the opposite ends 25a and 25b of the tube 25 of the power unit 21 are connected to conduits 45a and 45b, respectively, and the conduit 45a branches into a pressure supply line 46a and a pressure return line 47a, while the conduit 45b also branches into a pressure supply line 46b and a pressure return line 47b. The pressure supply lines 46a and 46b open into the bore 29 of valve housing 28 at adjacent locations near the center of the latter, while the pressure return lines 47a and 47b open into the bore 29 at locations spaced in the longitudinal direction of the housing from the related pressure supply lines toward the adjacent ends of the housing 28.

The fluid under pressure for the power unit 21 is supplied to the valve housing 28 through a conduit 48 opening into the bore 29 at the center of the valve housing, and the conduit 48 communicates with a branch conduit 49 connected to the conduit 35 at a location between the check-valve 42 and the pressure accumulator, and with a branch conduit 50 connected to the conduit 35 between the pump 41 and the check-valve 42 and having a check-valve 51 interposed therein to prevent the return flow of fluid under pressure from chamber 39 of the pressure accumulator through branch conduits 49 and 50 bypassing the check-valve 42. The fluid under pressure from the power unit 21 is exhausted from the valve housing 28 through one or the other of two exhaust conduits 52a and 52b which extend from the bore 29, at locations at opposite sides of the supply conduit 48, back to the tank or reservoir 34.

The valve body 31 has passages 53a and 53b extending generally diametrically therethrough and arranged so that, when the valve body is in its normal, centrally located position, as shown in Fig. 4, passage 53a has one end disposed between the openings of branch lines 46a and 47a and its other end disposed between the openings of conduits 48 and 52a, while passage 53b similarly has one end disposed between the openings of lines 46b and 47b and its other end disposed between the openings of conduits 48 and 52b, thereby closing both passages 53a and 53b and trapping whatever fluid is contained in the tube 25 of the power unit. Further, the passages 53a and 53b are arranged so that, when the valve body 31 is displaced to the left, as viewed in Fig. 4, to register the opposite ends of the passage 53b with the openings of the supply conduit 48 and the pressure supply line 46b, respectively, the passage 53a then registers, at its opposite ends, with the exhaust conduit 52a and the pressure return line 47a, respectively, and conversely, so that, when the value body is displaced to the right from its normal central position to register the opposite ends of passage 53a with the openings of the supply conduit 48 and the pressure supply line 46a, the passage 53b then registers, at its opposite ends, with the exhaust conduit 52b and the pressure return line 47b, respectively.

In the event that the bore 29 and the valve body 31 have circular cross-sections, as illustrated in Fig. 5, rotation of the valve body may be prevented by a pin 54 extending into the bore 29 from the housing 28 and engaging in a suitable longitudinal groove in the surface of the valve body so that the passages 53a and 53b will line-up properly with the several lines and conduits opening into the bore 29, as described above. Further, the valve body 31 has a bleed passage 55 (Figs. 4 and 5) extending longitudinally therethrough for a purpose hereinafter described in detail.

In order to provide for emergency control of the steering mechanism (not shown) operated by the shaft part 14 in the event of a failure in the above described servo drive power steering mechanism, a mechanical coupling 56, having angular play therein, connects together the shaft parts 13 and 14. As seen in Figs. 2 and 3, the coupling 56 may comprise a male splined section 57 on the lower end of shaft part 13 which is received in a female splined section 58 on the upper end of shaft part 14, the angular play in such a coupling being achieved by making the circumferential distances between the successive splines of the male and female splined sections greater than the circumferential extent of the splines of the female and male splined sections, respectively. Thus, during normal operation of the power steering mechanism 10, the shaft parts 13 and 14 are free to be angularly displaced relative to each other to an extent sufficient to ensure that the shaft part 14 will be rotated solely by the operation of the power unit 21 and that the resistance to rotation of the shaft part 14 will not be mechanically transmitted to the shaft part 13 to hinder rotation of the latter by the steering wheel 15. In order to relieve pressure in the power unit 21, bypass valve 60 connecting conduits 45a and 45b can be provided, said valve 60 being arranged to be closed when pressure is available from pump 41 for operating power unit 21, said valve automatically opening when pressure fails so that power unit 21 can not become locked when valve 16 is in center position. As one example, fluid motor 61 can be connected so that its piston 62 will be subjected to pump pressure through line 63. Spring 64 is provided to open valve 60 upon failure of pump pressure. The valve is shown in closed position with pump pressure being exerted against piston 62.

The above described servo drive power steering mechanism operates as follows:

When the steering wheel is turned in the clockwise direction, as viewed in Fig. 4, the corresponding rotation of the rotor 23 of actuating unit 20 will pump fluid through the tube 22 in the direction from end 22a to end 22b thereby increasing and decreasing the pressures acting against the left-hand and right-hand ends, respectively, of the valve body 31 and causing displacement of the latter toward the right from its normal central position. Such displacement of body 31 within the valve housing 28 causes fluid under pressure to be led from the accumulator 36, through conduits 49 and 48, passage 53a, pressure supply line 46a and conduit 45a, to the end 25a of the tube 25 in the power unit 25, while fluid from the end 25b of the tube 25 is returned to the tank 34 through conduit 45b, pressure return line 47b, passage 53b and conduit 52b. Thus, the fluid is pumped under pressure through the tube 25 in the direction causing clockwise rotation of rotor 26 and of shaft part 14 connected to the usual steering mechanism to operate the latter with an amplified force determined by the pressure head developed by the pump 41.

When rotation of the steering wheel in the clockwise direction is halted, the pressures acting against the opposite ends of valve body 31 are equalized through the bleed passage 55 of the latter, and the spring 32a, which had been compressed during the prior displacement of the valve body, then returns the latter to its normal central position established by the cooperative balancing of the springs 32a and 32b. Return of the valve body to its normal central position closes the ends of the lines 46a, 47a, 46b and 47b associated with the tube 25 of the power unit, so that the fluid in the tube 25, which fluid is substantially incompressible, is trapped in the tube and holds the rotor 26 and shaft part 14 against any further rotation.

When the steering wheel 15 is turned in the counter-clockwise direction, it will be apparent that the pumping action of the actuator unit 20 causes displacement of the valve body 31 to the left from its normal central position so that fluid under pressure flows through the passage 53b to the end 25b of the tube 25 while fluid is exhausted from the end 25a through the valve passage 53a thereby to cause rotation of rotor 26 of the power unit and of shaft part 14 in the counter-clockwise direction. Once again, when rotation of the steering wheel ceases, the valve body 31 is returned to its normal central position to trap the fluid in tube 25, thereby to maintain shaft part 14 in the angular position corresponding to the halted position of the steering wheel.

Although the present invention has been described in connection with a power steering mechanism for automobiles, it is obvious that other applications may be readily found for the described servo drive arrangement. Thus, the shaft part 13 may be connected to any handwheel, lever or the like, by which rotation of the shaft part 14 is to be controlled, and the shaft part 14 may be employed to operate devices other than an automobile steering mechanism, for example, sluice gates and the like.

Further, although a particular embodiment of the invention has been illustrated in the accompanying drawings and described in detail herein, it is to be understood that the invention is not limited to that particular embodiment, and that various changes and modifications may be effected in the latter without departing from the scope or spirit of the invention, except as defined in the appended claims.

What is claimed is:

1. In a servo drive mechanism for rotating a drive shaft part in response to rotated manipulation of an actuating shaft part; the combination comprising a reversible power unit including rigid fixed casing means defining an arcuate backing surface concentric with the drive shaft part, a resilient tube lying against said backing surface, a rotor fixed on the drive shaft part, and roller means on said rotor locally flattening said tube against said backing surface so that the rotor is rotatably driven in a selected direction in response to the pumping of fluid through said tube in the corresponding direction; means for supplying fluid under pressure to said resilient tube including valve means operative to determine the direction of flow of the fluid under pressure through said tube; an actuating unit including rigid fixed casing means defining an arcuate backing surface concentric with the actuating shaft part, a resilient tube lying against said backing surface of the actuating unit, and roller means locally flattening said tube of the actuating unit and movable along the related tube in response to rotated manipulation of the actuating shaft part to pump fluid through the related tube in the direction of said manipulation; and control means connected between said tube of the actuating unit and said valve means and operating the latter in response to the pumping of fluid through said tube of the actuating unit to cause the flow of fluid under pressure through said tube of the power unit, and consequently rotation of said rotor and of the drive shaft part, in the same direction as the manipulation of the actuating shaft part.

2. In a servo drive power steering mechanism for automobiles and the like; the combination comprising a steerable actuating shaft part; a drive shaft part adapted to drive a steering mechanism, said drive shaft part being disposed in axial alignment with said actuating shaft part and capable of at least limited angular displacement relative to the latter, reversible fluid pressure operated motor means connected to said drive shaft part for rotating the latter in opposite directions, means for supplying fluid under pressure to said motor means including fluid pressure operated valve means determining the direction of flow of fluid under pressure through said motor means and, hence, the direction of rotation of said drive shaft part, reversible fluid pumping means connected to said actuating shaft part and operated in response to steering rotation of the latter, and control means connected between said fluid pumping means and said valve means to operate the latter in response to operation of said pumping means by rotation of said steerable actuating shaft part thereby to cause flow of fluid under pressure through said motor means in the direction producing rotation of said drive shaft part in the same direction as the causal rotation of said steerable actuating shaft part.

3. In a servo drive power steering mechanism for automobiles and the like; the combination as in claim 2, further comprising mechanical coupling means between said actuating and drive shaft parts having angular play therein so that, normally, said drive shaft part is rotated solely by said motor means with said mechanical coupling means being inoperative to transmit the rotational resistance of said drive shaft part to said steerable actuating shaft part, and so that, upon a failure of said motor means to rotate said drive shaft part, said coupling means mechanically transmits the rotation of said steerable actuating shaft part to said drive shaft part.

4. In a servo drive power steering mechanism for automobiles and the like; the combination comprising a steerable actuating shaft part; a drive shaft part adapted to drive a steering mechanism, said drive shaft part being disposed in axial alignment with said actuating shaft part and capable of at least limited angular displacement relative to the latter, reversible fluid pressure operated motor means connected to said drive shaft part for rotating the latter in opposite directions, means for supplying fluid under pressure to said motor means including fluid pressure operated valve means determining the direction of flow of fluid under pressure through said motor means and, hence, the direction of rotation of said drive shaft part, reversible fluid pumping means including a rigid casing defining an arcuate backing surface concentric with said actuating shaft part, a resilient tube lying against said backing surface, roller means locally flattening said tube against said backing surface, a rotor fixed on said actuating shaft part and carrying said roller means so that, in response to rotation of said actuating shaft part, said roller means moves along said tube for pumping a fluid through the latter in the direction of rotation of said actuating shaft part, and control means for said valve means receiving fluid pumped through said tube and operating said valve means to dispose the latter for supplying fluid under pressure to said motor means in the direction causing rotation of said drive shaft part in the same direction as the causal rotation of the steerable actuating shaft part.

5. In a servo drive power steering mechanism for automobiles and the like; the combination comprising a steerable actuating shaft part, a drive shaft part adapted to drive a steering mechanism, said drive shaft part being disposed in axial alignment with said actuating shaft part and capable of independent rotation through at least a limited relative angular displacement, reversible fluid pressure operated motor means including rigid casing means defining an arcuate backing surface concentric with the axis of said drive shaft part, a resilient tube lying against said backing surface, roller means locally flattening said tube against said backing surface and a rotor fixed on said drive shaft part and carrying said roller means so that, when the latter is moved along said tube by a flow of fluid under pressure through the latter, said drive shaft part is rotated in the direction of said flow, means for supplying fluid under pressure to said tube of the reversible motor means including fluid pressure operated valve means determining the direction of flow of fluid under pressure through said tube, reversible fluid pumping means connected to said actuating shaft part and operated in response to steering rotation of the latter, and control means connected between said fluid pumping means and said valve means to operate the latter in response to operation of said pumping means by rotation of said steerable actuating shaft part thereby to cause flow of fluid under pressure through said motor means in the direction producing rotation of said drive shaft part in the same direction as the causal rotation of said steerable actuating shaft part.

6. In a servo drive power steering mechanism for automobiles and the like; the combination comprising a steerable actuating shaft part, a drive shaft part adapted to drive a steering mechanism, said drive shaft part being disposed in axial alignment with said actuating shaft part and capable of independent rotation through at least a limited relative angular displacement, reversible fluid pressure operated motor means including rigid casing means defining an arcuate backing surface concentric with the axis of said drive shaft part, a resilient tube lying against said backing surface, roller means locally flattening said tube against said backing surface and a rotor fixed on said drive shaft part and carrying said roller means so that, when the latter is moved along said tube by a flow of fluid under pressure through the latter, said drive shaft part is rotated in the direction of said flow, means for supplying fluid under pressure to said tube of the reversible motor means including fluid pressure operated valve means determining the direction of flow of fluid under pressure through said tube, reversible fluid pumping means including a resilient tube lying against said backing surface and roller means carried by said actuating shaft part and locally flattening said tube of the pumping means against said backing surface so that, in response to rotation of said actuating shaft part, fluid is pumped through said tube of the pumping means in the direction of said rotation, and control means for said valve means receiving fluid pumped through said tube of the pumping means and operating said valve means to dispose the latter for supplying fluid under pressure to said tube of the motor means in the direction causing rotation of said drive shaft part in the same direction as the causal rotation of the steerable actuating shaft part.

7. In a servo drive power steering mechanism for automobiles and the like; the combination comprising a steerable actuating shaft part, a drive shaft part adapted to drive a steering mechanism, said drive shaft part being disposed in axial alignment with said actuating shaft part and capable of independent rotation through at least a limited relative angular displacement, reversible fluid pressure operated motor means including rigid casing means defining an arcuate backing surface concentric with the axis of said drive shaft part, a resilient tube lying against said backing surface, roller means locally flattening said tube against said backing surface and a rotor fixed on said drive shaft part and carrying said roller means so that, when the latter is moved along said tube by a flow of fluid under pressure through the latter, said drive shaft part is rotated in the direction of said flow, a source of fluid under pressure, conduit means extending from the opposite ends of said tube, fluid exhaust means, valve means interposed between said conduit means and said fluid source and fluid exhaust means and movable between a normal position blocking said conduit means and first and second oppositely displaced positions where the opposite ends of said tube are communicated with said source and exhaust means and with said exhaust means and source, respectively, and an actuating unit connected to said actuating shaft part and operative, in response to rotation of the latter, to shift said valve means from said normal position to a selected one of said oppositely displaced positions depending upon the direction of rotation of said actuating shaft part thereby to permit the flow of fluid under pressure from said source through said tube to said exhaust means in the direction causing rotation of said drive shaft part in the same direction as the causal rotation of said actuating shaft part.

8. In a servo drive power steering mechanism for automobiles and the like; the combination as in claim 7, wherein said valve means includes a housing having a longitudinal bore therein receiving a valve body shiftable longitudinally therein, and spring means normally holding said valve body at a central location corresponding to said normal position of the valve means, and wherein said actuating unit includes reversible pump means connected to the opposite ends of said valve housing so that, in response to operation of said pump means by rotation of the actuating shaft part, a differential is created between the pressures in said housing acting against the opposite ends of said valve body for shifting said valve body from said central location to a location corresponding to a related one of said first and second displaced positions.

9. In a servo drive power steering mechanism for automobiles and the like; the combination as in claim 8, wherein said valve body further has a longitudinal bleed passage extending therethrough so that, when the operation of said pump means is halted, the pressures acting against the opposite ends of the valve body can be equalized through said bleed passage to permit the return of said body to its central location by said spring means.

10. In a servo drive power steering mechanism for automobiles and the like; the combination as in claim 9, wherein said pump means includes a resilient tube lying against said backing surface, roller means locally flattened said tube of the pump means against said backing surface, rotor means on said actuating shaft part carrying said roller means of the pump means to pump fluid through the related tube in the direction of rotation of the actuating shaft part, and conduit means connecting the opposite ends of said tube of the pump means to the ends of said valve housing.

References Cited in the file of this patent

UNITED STATES PATENTS

| | | |
|---|---|---|
| 2,020,041 | Rockcastle et al. | Nov. 5, 1935 |
| 2,411,119 | Stephens | Nov. 12, 1946 |

FOREIGN PATENTS

| | | |
|---|---|---|
| 12,196 | Great Britain | June 28, 1848 |
| 11,827 | Great Britain | June 24, 1892 |